United States Patent
Bongartz

(10) Patent No.: US 11,725,682 B2
(45) Date of Patent: Aug. 15, 2023

(54) METHOD FOR CONNECTING TWO COMPONENTS FOR CONJOINT ROTATION

(71) Applicant: Nicole Bongartz, Neuss (DE)

(72) Inventor: Nicole Bongartz, Neuss (DE)

( * ) Notice: Subject to any disclaimer, the term of this patent is extended or adjusted under 35 U.S.C. 154(b) by 428 days.

(21) Appl. No.: 17/252,594

(22) PCT Filed: Jun. 15, 2018

(86) PCT No.: PCT/EP2018/066029
§ 371 (c)(1),
(2) Date: Dec. 15, 2020

(87) PCT Pub. No.: WO2019/238250
PCT Pub. Date: Dec. 19, 2019

(65) Prior Publication Data
US 2021/0270305 A1  Sep. 2, 2021

(51) Int. Cl.
*F16B 23/00* (2006.01)
*B25B 15/00* (2006.01)
*B25B 23/10* (2006.01)

(52) U.S. Cl.
CPC ........ *F16B 23/0007* (2013.01); *B25B 15/008* (2013.01); *B25B 23/108* (2013.01); *F16B 23/0053* (2013.01)

(58) Field of Classification Search
CPC . F16B 23/0007; F16B 23/0053; B25B 15/008
See application file for complete search history.

(56) References Cited

U.S. PATENT DOCUMENTS

| | | | |
|---|---|---|---|
| 4,269,246 A | 5/1981 | Larson et al. | |
| 5,012,706 A | 5/1991 | Wright et al. | |
| 2006/0266168 A1 | 11/2006 | Pacheco | |
| 2010/0269644 A1 | 10/2010 | Edland et al. | |
| 2013/0213193 A1* | 8/2013 | Lukes | B25B 15/004 81/436 |

FOREIGN PATENT DOCUMENTS

| | | |
|---|---|---|
| AT | 388215 B | 10/1988 |
| DE | 3007945 A1 | 11/1980 |
| DE | 29816210 U1 | 2/1999 |
| DE | 102005011734 A1 | 9/2006 |
| FR | 2201645 A5 | 4/1974 |
| WO | WO2013062895 A1 | 5/2013 |

* cited by examiner

*Primary Examiner* — Jason L Vaughan
*Assistant Examiner* — Amanda Kreiling
(74) *Attorney, Agent, or Firm* — Calderon, Safran & Cole P.C.

(57) ABSTRACT

A method for connecting a screw and a rotary tool in a rotationally fixed manner, wherein the drive surfaces of the driving profiles have a constant inclination relative to their profile axis, which is the same for all drive surfaces of both components. In the component with the outer driving profile, the drive surfaces are all concave or all convex, and in the component with the inner driving profile, the drive surfaces are curved complementary to the drive surfaces of the outer driving profile, in such a way that, in the plugged-together state, the drive surfaces of the two components, viewed in the circumferential direction, come into surface contact/engagement with one another on both sides of the apex of the concave/convex curvature. The driving profiles are designed in such a way that they do not come into contact with each other in the transition regions located between the drive surfaces.

20 Claims, 14 Drawing Sheets

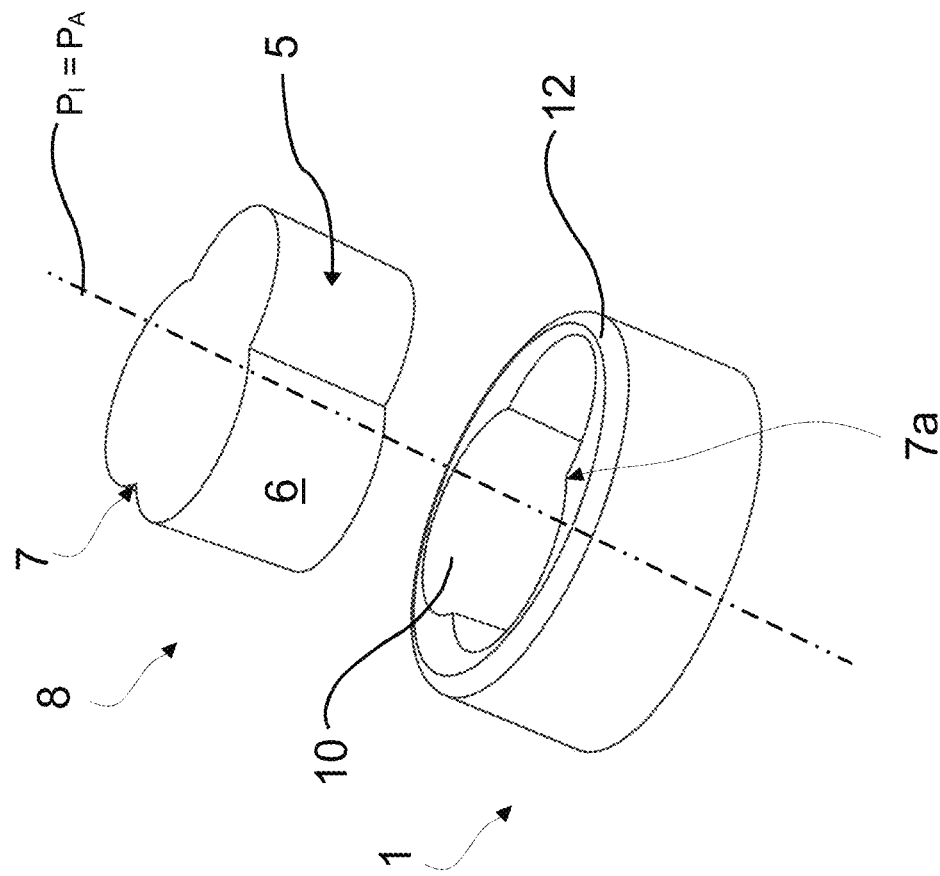

---

METHOD FOR CONNECTING TWO COMPONENTS FOR CONJOINT ROTATION

CROSS-REFERENCE TO RELATED APPLICATIONS AND CLAIM TO PRIORITY

This application is a national stage application of International Application No. PCT/EP2018/066029 filed Jun. 15, 2018, the disclosures of which are incorporated herein by reference and to which priority is claimed.

FIELD OF THE INVENTION

The present invention relates to a method for connecting two components, namely a screw and a rotary tool, in a rotationally fixed manner with respect to the longitudinal axis of the component designed as a screw, wherein one of the components has an outer driving profile with external drive surfaces and the other component has an inner driving profile being complementary to the outer driving profile and having internal drive surfaces, by plugging the driving profiles of the components together axially in order to achieve a positive, rotationally fixed connection of the components by the interaction of the driving profiles, wherein the driving profiles each define a profile axis and the profile axis of the component designed as a screw extends coaxially to the longitudinal axis thereof, the drive surfaces of the component with the outer driving profile are inclined relative to the respective profile axis of the component and approach the respective profile axis towards the free end of the component, the drive surfaces of the component with the inner driving profile are inclined relative to the respective profile axis of the component and become averted from the respective profile axis towards the free end of the component, and the driving profiles are designed complementary to one another in such a way, that the inclined drive surfaces of the components come into surface contact with one another, when the components are plugged together axially, so that the interaction of the driving profiles produces a force-fit and/or clamping connection between the components, via which the components are axially connected to one another.

In addition, the invention relates to a component, in particular in the form of a screw with a shank defining a longitudinal axis of the screw and having at its one free end—the head end—a driving profile with internal or external drive surfaces, said driving profile defining a profile axis extending coaxially with the longitudinal axis, wherein the drive surfaces of the driving profile are inclined relative to the profile axis, and wherein the internal drive surfaces of an inner driving profile become averted from the respective profile axis towards the free end of the driving profile and the external drive surfaces of an outer driving profile approach the profile axis towards the free end of the driving profile.

Furthermore, the invention relates to a component in the form of a rotary tool, which has a driving profile with internal or external drive surfaces at one end, which driving profile defines a profile axis, wherein the drive surfaces of the driving profile are inclined relative to the profile axis, and wherein the external drive surfaces of an outer driving profile approach the profile axis towards the free end of the driving profile and the internal drive surfaces of an inner driving profile become averted from the profile axis towards a receiving opening of the driving profile.

Finally, the invention relates to a kit with a screw and a rotary tool.

BACKGROUND OF THE INVENTION

Screws and rotary tools are known from the prior art in different embodiments. The screws comprise a screw shank with an external thread, at the upper end region of which a driving profile is provided for coupling with a rotary tool, which driving profile is usually formed on a screw head. The rotary tools are designed in the form of ring or open-ended wrenches, for example, or comprise exchangeable bits which are connected to a drive, for example in the form of a handle or cordless screwdriver, by means of a bit holder. Alternatively, the bit holder can be connected via an adapter for exchangeable use with a screwdriver handle or an angled handle, with a ratchet, a torque wrench, a cordless screwdriver or a ratchet screwdriver.

Screw and rotary tool are offered with complementary driving profiles to transfer torque from the rotary tool to the screw. For this purpose, one of the two components has an outer driving profile with external drive surfaces at one of its free ends and the other component has an inner driving profile with internal drive surfaces at its free end, which is formed complementary to the outer driving profile. The driving profiles are, for example, designed in the form of an internal hexagon, an external hexagon, a Torx profile and a cross-slotted or slotted profile. After coupling the inner driving profile with the outer driving profile, the driving profiles lie against each other with play. This leads to the fact that the driving profiles can become detached from each other in an unintentional way, and it is not possible to align the driving profiles cleanly with each other axially. In order to simplify the handling when screwing and unscrewing the screw with a rotary tool, rotary tools, that are equipped with a magnet, or ferromagnetic rotary tools, that can be magnetized with a magnet, are available. However, this is connected with additional effort. Furthermore, a coaxial alignment of the driving profiles cannot be achieved by using a magnetic turning tool. However, such coaxial alignment is necessary in order to integrate screw connections into automatic manufacturing processes.

In order to solve this problem, DE 10 2005 011 734 A1 discloses that the drive surface of a rotary tool for screwing and unscrewing so-called Torx screws is inclined at an acute angle to the profile axis, so that when the driving profiles of the rotary tool and a screw are plugged together axially, a clamping fit is created and thus no additional holding devices are required to screw the screw into a thread. Similarly, it is known from WO 2013/062895 A1 and US 2010/0269644 A1 that the drive surfaces of the screw and the rotary tool are inclined in order to create a clamping fit between the components.

A problem that repeatedly occurs when screwing and unscrewing screws is that the driving profiles are damaged, in particular in the region of the edges, if the torques required to screw in/unscrew the screw are too high.

SUMMARY OF THE INVENTION

The task of the present invention is therefore to design a method for connecting a screw and a rotary tool in a rotationally fixed manner of the aforementioned type in such a way that a high force or torque transmission is possible without damaging the driving profiles. Furthermore, a screw and a rotary tool as well as a kit comprising a screw and a rotary tool should be specified, which are suitable for carrying out the procedure.

In a method of the type mentioned above, this task is solved in that components are used, in which the drive surfaces of the driving profiles have a constant inclination relative to their profile axis in the contact regions, in which they come into surface contact/engagement, which inclination is the same for all drive surfaces of both components, and in that a component with an outer driving profile is used, in which the drive surfaces are all concave or all convex in cross-section, i.e. inwardly or outwardly curved, and a component with an inner driving profile complementary to the outer driving profile is used, the drive surfaces of which inner driving profile are curved in a complementary convex/concave manner with respect to the drive surfaces of the outer driving profile in such a way that, in the plugged state, the drive surfaces of the two components, viewed in the circumferential direction, come into surface contact/engagement with one another on both sides of the apex of the concave/convex curvature, and in that the driving profiles are designed in such a way that they do not come into contact with one another in the transition regions lying between the drive surfaces.

The present invention is thus based on the consideration that, when two components are plugged together, in addition to a positive and rotationally fixed connection, force-fit and/or clamping connection between the screw and the rotary tool is also to be produced, via which the components are axially connected to one another and aligned coaxially with one another. In this way, the two components are connected to each other in coaxial alignment of the driving profiles without play, so that the components can be used in automated processes. In order to achieve the force-fit and/or clamping connection between the two components, the components have corresponding driving profiles with conically inclined contact surfaces. The inclination of the drive surfaces with respect to the profile axis is measured along the apex of the concave/convex drive surface. The driving profiles are selected to be complementary to each other in such a way that the inclined drive surfaces of the components come into contact/engagement with each other over a large area on both sides of the apex of the concave/convex curvature when the components are plugged together, whereas contact is avoided in the transition regions between the drive surfaces. When the two driving profiles are plugged together axially, the contact surfaces are thus aligned exactly with each other and the torque transmission takes place exclusively or essentially via the force-fit connection between the two components. Damage in edge areas is completely avoided, since the driving profiles are not in contact with each other in the transition regions between the drive surfaces.

The preferred arrangement is that contact zones are formed between the corresponding drive surfaces of the two components, which, viewed in the circumferential direction, extend from one side of the apex of the concave/convex curvature beyond the apex to the opposite side of the apex. In particular, components are used, the drive surfaces of which are designed to be complementary to one another in such a way that, viewed in circumferential direction, the drive surfaces of the two components are surface contact with one another over at least 25%, in particular at least 40% and preferably at least 60% of their extent in the circumferential direction.

According to the invention, components can be used, the drive surfaces of which have a parabolic segment-shaped cross-section in the contact region over their length.

Alternatively, components can also be used, in which the drive surfaces of the driving profiles have a circular arc segment-shaped cross-section over their length with a radius which is constant over the axial length in the contact region. In this case, the drive surfaces can be produced using a cylindrical milling cutter, which is adjusted relative to the profile axis according to the angle by which the drive surfaces should be inclined relative to the profile axis. In the same way, components can be used, in which the drive surfaces of the driving profiles have a circular arc segment-shaped cross-section, wherein the radius of the circular arc segment-shaped cross-section changes continuously over the length of the drive surfaces in the contact region. In this case, the drive surfaces can be produced using a milling cutter which has a conicity corresponding to the desired angle of inclination of the drive surfaces.

According to an embodiment of the invention, it is provided that components with an outer driving profile and/or with an inner driving profile are used, in which the transition regions lying between the drive surfaces have an opposite curvature to that of the drive surfaces, wherein the curvature of the transition regions of the outer driving profile is smaller than the curvature of the transition regions of the inner driving profile, when the drive surfaces of the outer driving profile are concavely curved so that the apex of the curvature faces in the direction of the profile axis, and the curvature of the transition regions of the outer driving profile is larger than the curvature of the transition regions of the inner driving profile, when the drive surfaces of the outer driving profile are convexly curved. In particular, it may be provided that the transition regions of the component with the outer driving profile and/or of the component with the inner driving profile are formed in the shape of a segment of a circle arc in cross-section, wherein the radii of the transition regions of the outer driving profile are larger than the radii of the transition regions of the inner driving profile, when the drive surfaces of the outer driving profile are concavely curved so that the apex of the curvature faces the profile axis, and the radii of the transition regions of the outer driving profile are smaller than the radii of the transition regions of the inner driving profile, when the drive surfaces of the outer driving profile are convexly curved, and wherein the radii of the transition regions are preferably constant over the length of the drive surfaces.

In these embodiments, the transition regions and the drive surfaces preferably merge continuously into one another, so that the formation of an edge is avoided.

Alternatively, it is possible to form the transition regions by flat surfaces.

The angle of inclination of the drive surfaces relative to the profile axis is selected depending on the length of the drive surfaces in the direction of the profile axis. In principle the greater the extension of the drive surfaces along the respective profile axis, the greater the angle of inclination of the inclined drive surfaces relative to the profile axis. Preferably, components are used, in which the drive surfaces of the driving profiles are inclined in the contact region by at least 1°, in particular by at least 2°, relative to the profile axis of the respective component, and/or in that components are used, in which the inclined drive surfaces of the driving profiles are inclined by at most 8°, preferably by at most 5°, relative to the respective profile axis.

Preferably, components are used, in which the drive surfaces of the driving profiles are inclined in the contact region by at least 1.5°, in particular at least 2° and at most 3.5°, preferably by 3°, relative to the profile axis of the respective component.

According to the invention, components can also be used, the driving profiles of which, viewed in the circumferential direction, have 3, 4 or 6 drive surfaces next to one another with transition regions lying in between. In this context, components can be used, the driving profiles of which have the cross-section of a multi-circle, wherein, in particular, components are used, the driving profiles of which have the cross-section of a multi-circle with ogival arms and/or components are used, the driving profiles of which have the cross-section of a multi-circle with six arms.

Components can also be used, the driving profiles of which are designed as Torx profiles with drive surfaces inclined to the respective profile axis. By using hexalobular Torx profiles such as Torx, Torx-TR, Torx Plus and Torx Plus Security, high momentums can be transmitted from the rotary tool to the screw without damaging the screw and the rotary tool.

According to the invention, the task of the present invention is also solved by a component in the form of a screw of the type mentioned above, which is characterized in that the drive surfaces of the driving profile each have the same inclination relative to the profile axis, which inclination is constant over the axial length of a defined contact region with which the driving profile is to be brought into contact/engagement with a driving profile of a rotary tool, and in that the inclined drive surfaces of the driving profile are all concave or all convex, i.e. inwardly or outwardly curved, wherein they are each formed symmetrically to their longitudinal central plane including the profile axis.

As already mentioned, the drive surfaces can have a parabolic segment-shaped cross-section or a circular arc segment-shaped cross-section in the contact region, wherein, with a circular arc segment-shaped design, the radius in the contact region can be constant or continuously variable over the axial length of the drive surfaces.

In a preferred manner, the width across flats of the driving profile is 1.6 times the radius of curvature of the drive surfaces ±20%.

Furthermore, the task of the present invention is also solved, according to the invention, by a component in the form of a rotary tool of the type mentioned-above, which is characterized in that the drive surfaces of the driving profile each have the same inclination relative to the profile axis, which inclination is constant over the axial length of a defined contact region with which the driving profile is to be brought into contact/engagement with a driving profile of a component to be rotated, in particular in the form of a screw, and in that the inclined drive surfaces of the driving profile are all concave or all convex, i.e. inwardly or outwardly curved in cross section, wherein they are each formed symmetrically to their longitudinal central plane including the profile axis.

The drive surfaces can have a parabolic segment-shape cross-section in the contact region. Alternatively, they can also have a circular arc segment-shaped cross-section with a constant radius over the axial length of the drive surfaces or with a radius in the contact region that continuously changes over the axial length of the drive surfaces.

In the usual way, the rotary tool can be designed in the form of a bit in which an inner driving profile is formed.

Alternatively, the rotary tool can be designed in the form of a ring wrench, which has a tool shank that has an inner driving profile at least one axial end, which passes through the rotary tool transversely to its shank axis.

With regard to further embodiments and advantages of the screw and the rotary tool, reference is made to the above explanation in connection with the method according to the invention for the rotationally fixed connection of two components, namely a screw and a turning tool, in order to avoid repetition.

Preferably, at the screw as well as at the turning tool, transition regions are provided between the drive surfaces, which are of flat design or have a curvature inverse to the drive surfaces. The transition regions can be formed in the shape of a circular arc segment in cross-section, wherein the radii of the circular arc segment-shaped transition regions preferably are constant over the axial length of the drive surfaces. It is advisable for the transition regions and the drive surfaces to merge continuously into one another.

Furthermore, it may be provided that the drive surfaces of the driving profile are inclined in the contact region by at least 1°, preferably by at least 2° relative to the profile axis, and/or in that the inclined drive surfaces of the driving profile are inclined by at most 8°, preferably by at most 5°, relative to the profile axis, and/or in that the drive surfaces are continuously inclined and in particular have a constant inclination. In particular, the inclined drive surfaces of the driving profile can be inclined in the contact region by at least 1.5° and by at most 3.5° and preferably by 3° relative to the profile axis. It is essential that all drive surfaces of the components are formed identically.

Finally, the task of the present invention is also solved by a kit, which is characterized in that the drive surfaces of the driving profiles of the two components have a constant inclination relative to their profile axis in the contact regions in which they come into surface contact/engagement when they are plugged together axially, which inclination is identical for all drive surfaces of both components, and the curvatures of the drive surfaces of the two components are complementary to one another in such a way that the drive surfaces of the two components come into surface contact/engagement in the circumferential direction on both sides of the apex of the concave/convex curvature of the drive surfaces, and in that the driving profiles are designed in such a way that they do not come into contact with one another in the transition regions lying between the drive surfaces, when the driving profiles are plugged together axially.

BRIEF DESCRIPTION OF THE DRAWINGS

Further features and advantages of the present invention become clear from the following description of an embodiment of the components according to the invention with reference to the enclosed drawing. In the drawing shows.

DETAILED DESCRIPTION OF THE PREFERRED EMBODIMENT(S)

Figure 1:
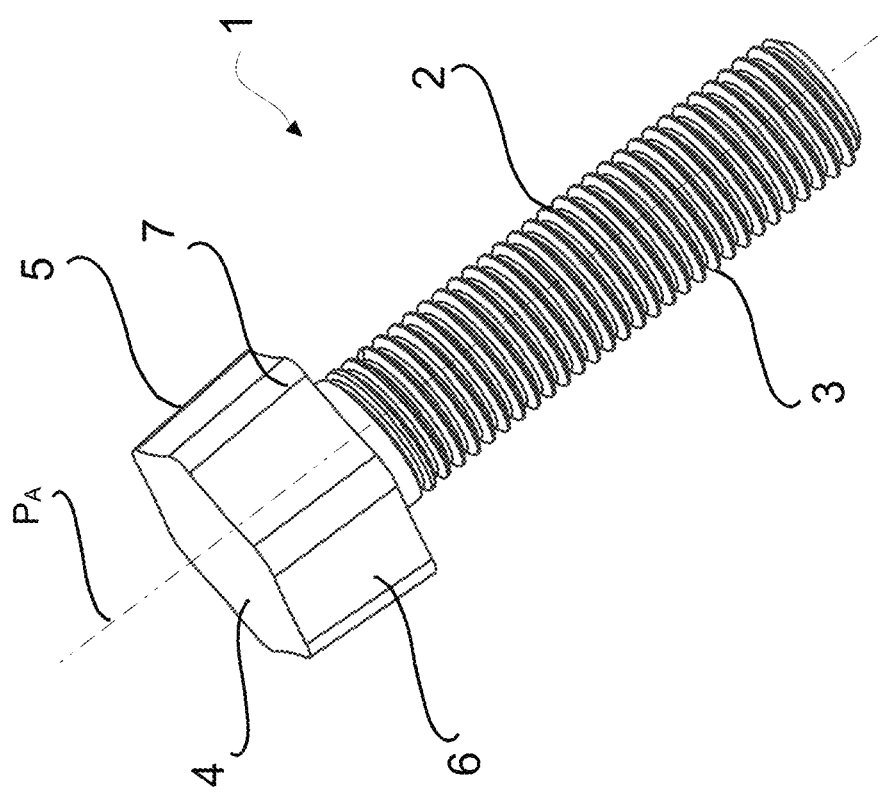
FIG. 1 a perspective view of a screw with an outer driving profile according to a first embodiment of the present invention, FIG. 2 a top view of the screw head of the screw from FIG. 1, FIG. 3 a perspective view of a tool in the form of a bit with an inner driving profile according to a first embodiment of the present invention, FIG. 4 the bit from FIG. 3 from below, FIG. 5 a perspective view of the screw from FIGS. 1 and 2 and the bit according to FIGS. 3 and 4 when plugged together axially, FIG. 6 a top view of the arrangement from FIG. 5 when plugged together, FIG. 7 the bit from FIG. 4 with marked contact zones, FIG. 8 a perspective view of the bit with marked contact zones, FIG. 9 a schematic front view of a screw with an inner driving profile and a corresponding bit according to a second embodiment of the present invention, FIG. 10 a perspective view of the screw and bit from FIG. 9, FIG. 11 the process of plugging-together the screw and the bit from FIG. 9, FIG. 12 the screw and the bit when plugged together, FIG. 13 a perspective view of a screw with an inner driving profile and a corresponding bit according to a third embodiment of the present invention, FIG. 14 a perspective view of a screw and corresponding bit according to a fourth embodiment of the present invention.
Figure 2:
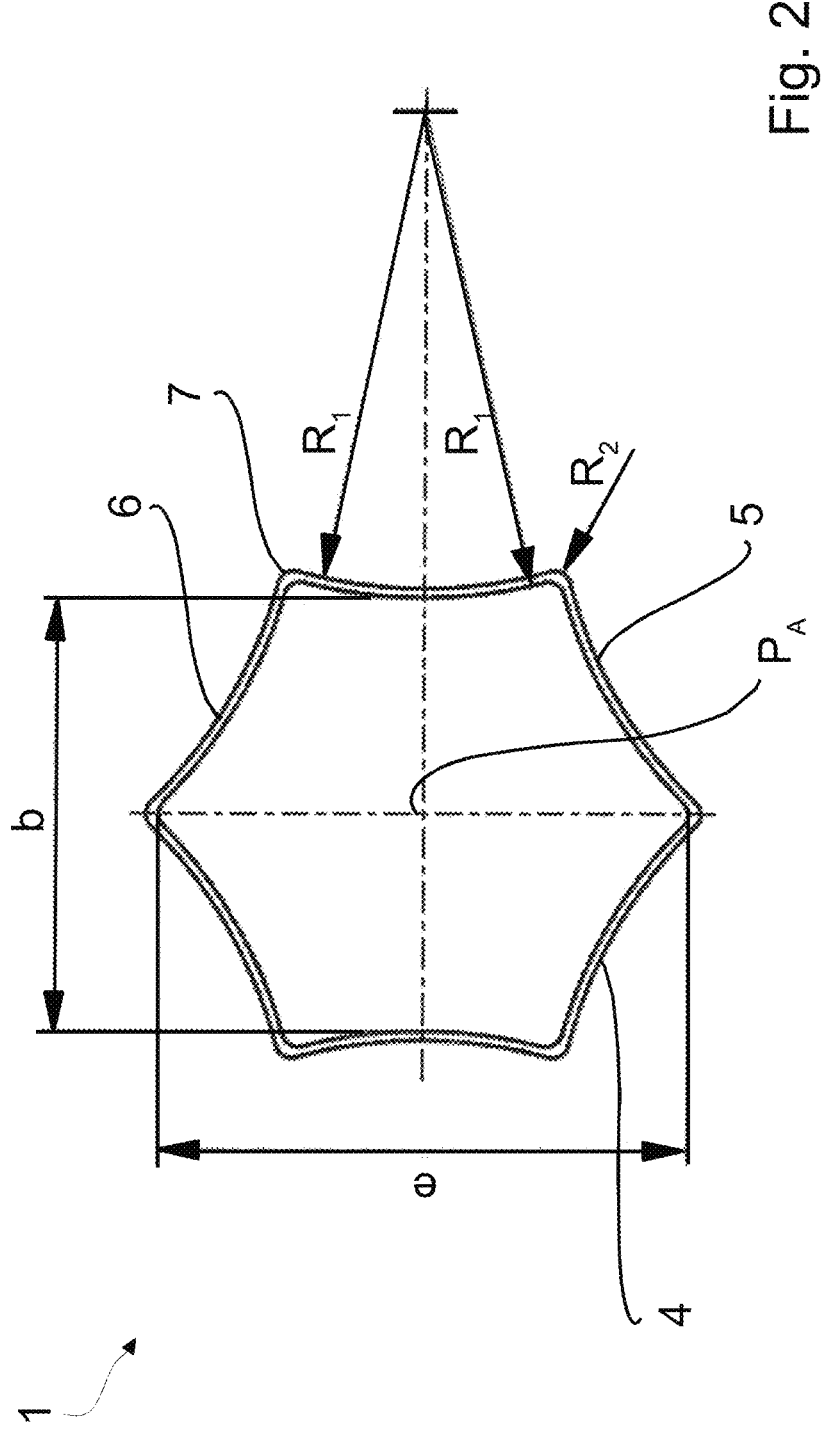

FIGS. 1 and 2 show a screw 1 according to a first embodiment of the present invention. Screw 1 comprises a shank 2, which carries an external thread 3 and defines a longitudinal axis of screw 1. At the upper end of the shank 2, a screw head 4 is provided, which has an outer driving profile 5 with external drive surfaces 6 on its outside, which driving profile 5 defines a profile axis $P_A$ extending coaxially to the longitudinal axis of the screw 1. In concrete terms, an M8 screw 1 with a shank length of 40 mm and a head height of 5.5 mm is shown. As it is clearly visible on the figures, the outer driving profile 5 has the basic shape of a regular hexagon in cross-section or top view, the side faces of which form drive surfaces 6, which are inclined at an angle $\alpha=3°$ to the profile axis $P_A$ all the longitudinal axis of the screw 1, so that they approach the profile axis $P_A$ towards the free end of the screw head 4. In other words, the screw head 4 tapers towards its free end.

In contrast to conventional screws with external hexagonal engagement, the drive surfaces 6 of the outer driving profile 5 are not flat, but concave in cross-section, i.e. curved inwards towards the profile axis $P_A$. Specifically, the concave drive surfaces 6 each have a circular arc segment-shape in cross-section, wherein the radius R1 of the drive surfaces 6 is constant over the entire axial length of the screw head 4.

The drive surfaces 6 are separated from each other in the region of the hexagonal edges by transition regions 7, which are circular arc-shaped with a radius R2 that is constant over the axial length of the screw head 4. The arrangement is such that the drive surfaces 6 and the transition regions 7 merge continuously into each other without forming edges.

Figure 3:
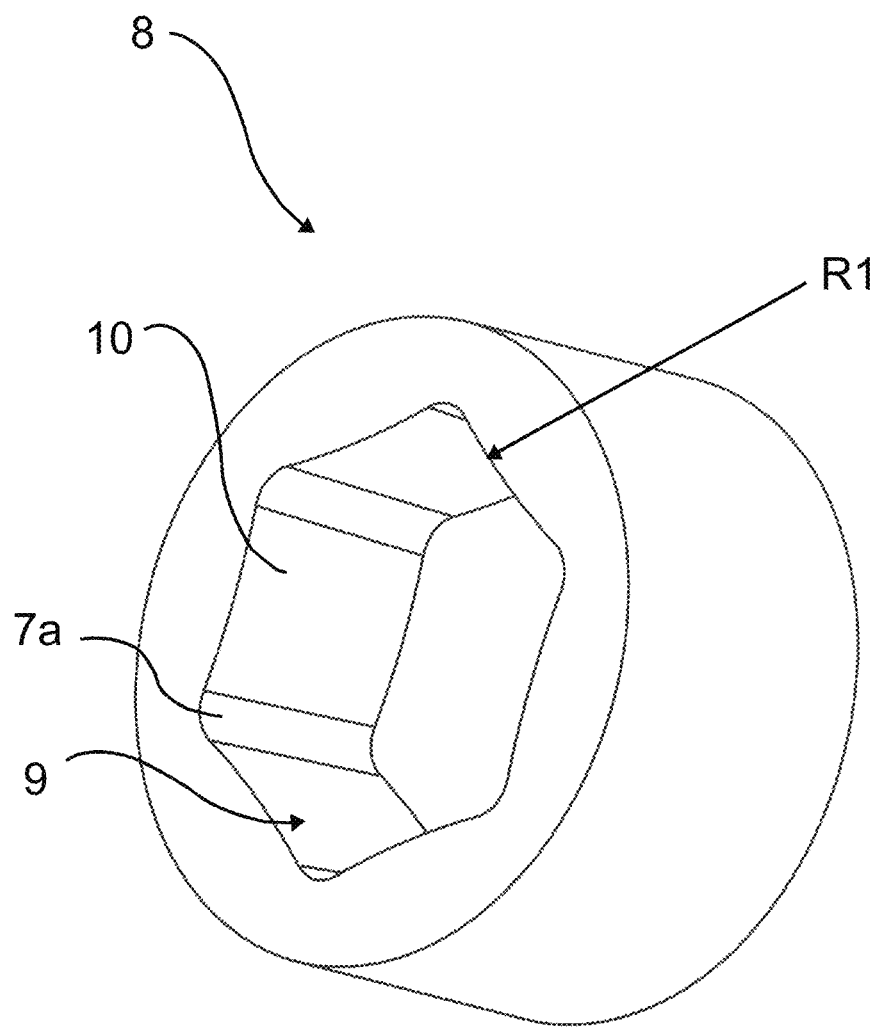
Figure 4:
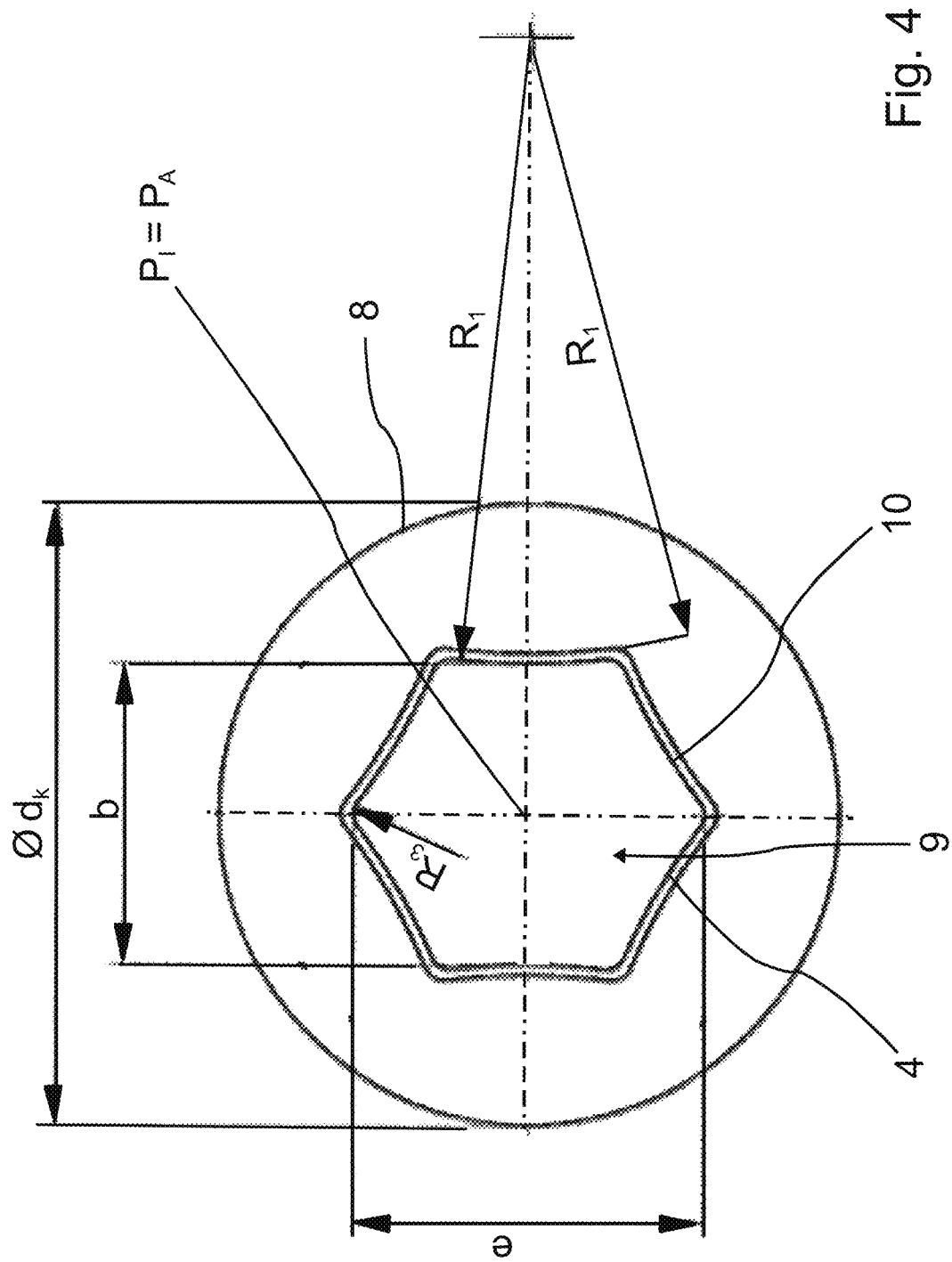
Figure 5:
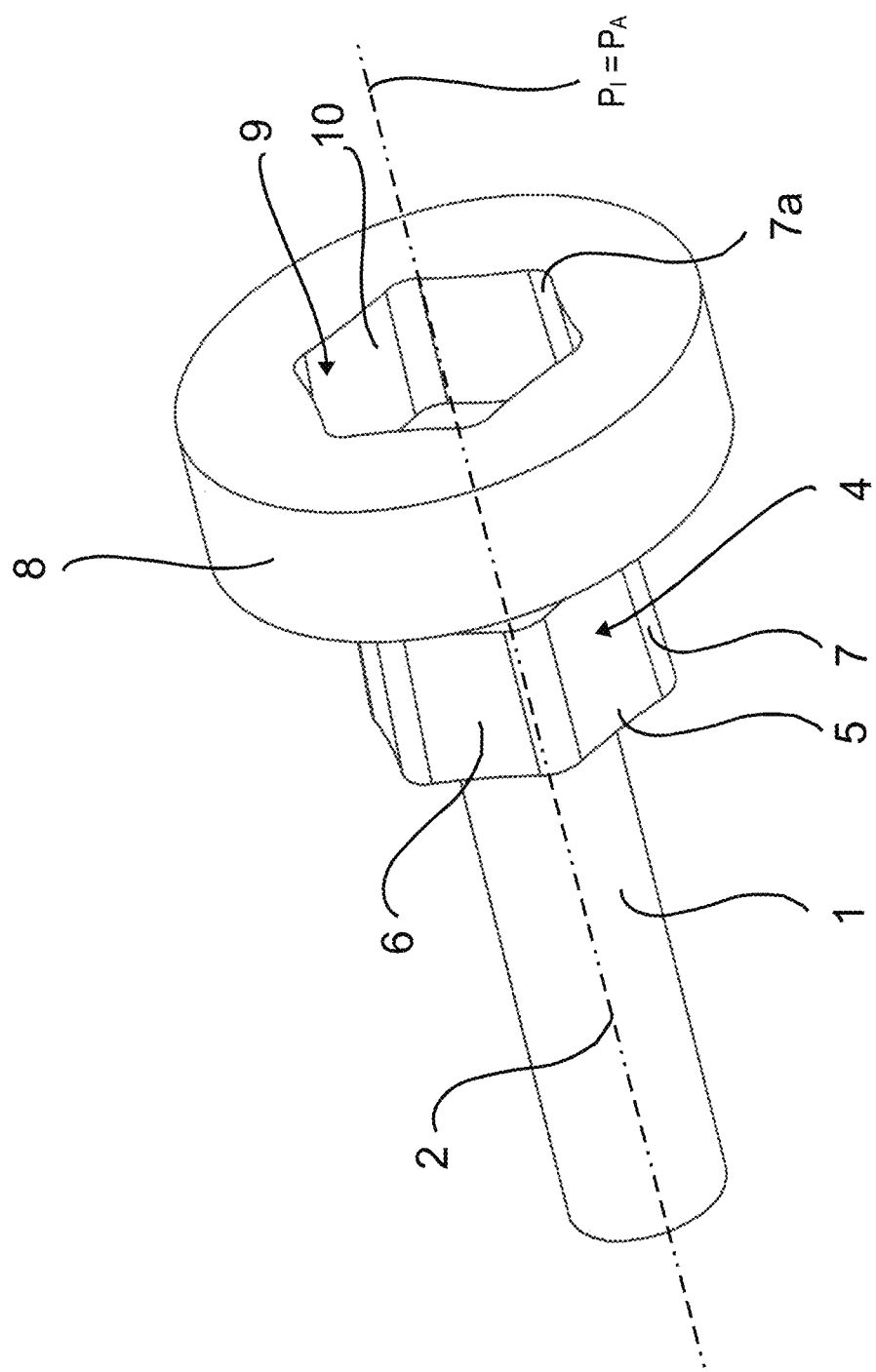
Figure 6:
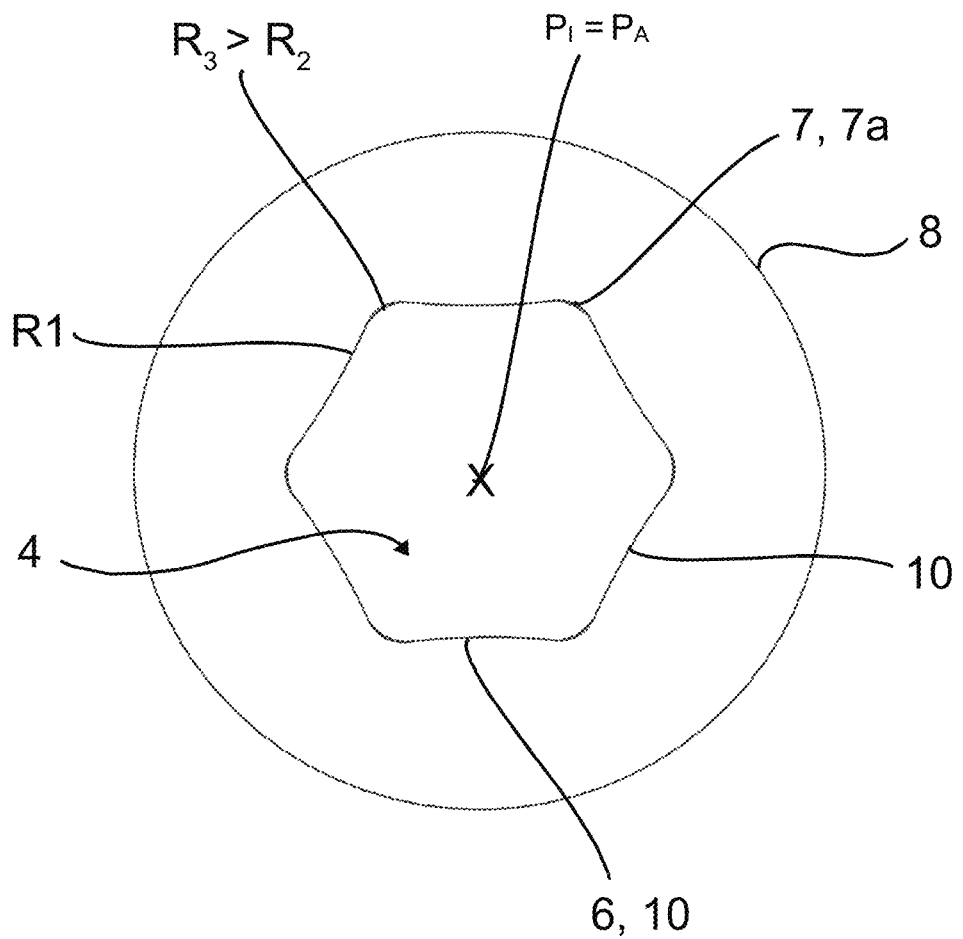

FIGS. 3 and 4 show a rotary tool 8 in the form of a bit with an inner driving profile 9, which is designed to operate the screw 1 shown in FIGS. 1 and 2. The rotary tool 8 has an inner driving profile 9, which corresponds to the screw head of screw 1 and defines a profile axis $P_I$. Correspondingly, the inner driving profile 9 has the basic shape of a hexagon in cross-section, wherein the drive surfaces 10 of the driving profile 9 are concave, i.e. curved in the direction of the profile axis $P_I$, and are inclined to the profile axis $P_I$. In concrete terms, the drive surfaces 10, like the drive surfaces 6 of the screw, are inclined at an angle of 3° with respect to the profile axis $P_I$, approaching the profile axis $P_I$ from a bit receiving or insertion opening to the end of the inner driving profile located inside the tool 8. In other words, the contour of the inner driving profile 9 tapers inwards.

Furthermore, the drive surfaces 10 are designed as circular arc segments with a radius R1 which is constant over the axial length of the driving profile 9 and has the same value as the radius of curvature R1 of the drive surfaces 6 of screw 1. The drive surfaces 10 are separated from each other by transition regions 7a which are designed in the shape of a circular arc and have a radius R3 which remains constant over the entire length of the driving profile 9. The arrangement is such that the transition regions of screw 1 and bit 8 do not come into contact with each other. Accordingly, the radius of curvature R3 for bit 8 is smaller than the radius of curvature R2 for screw 1.

Figure 7:
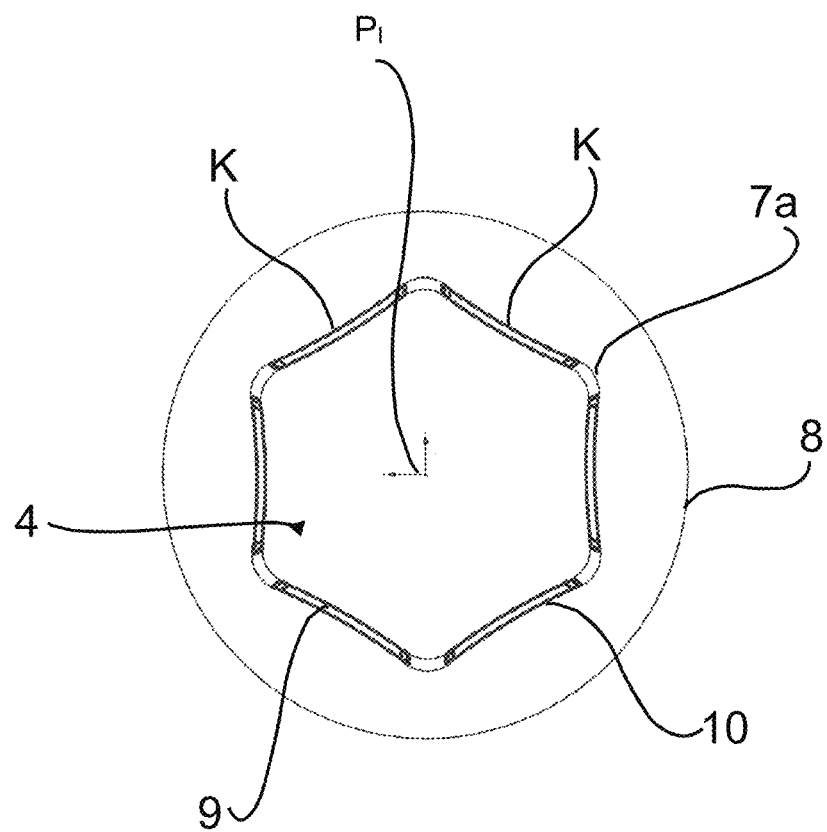
Figure 8:
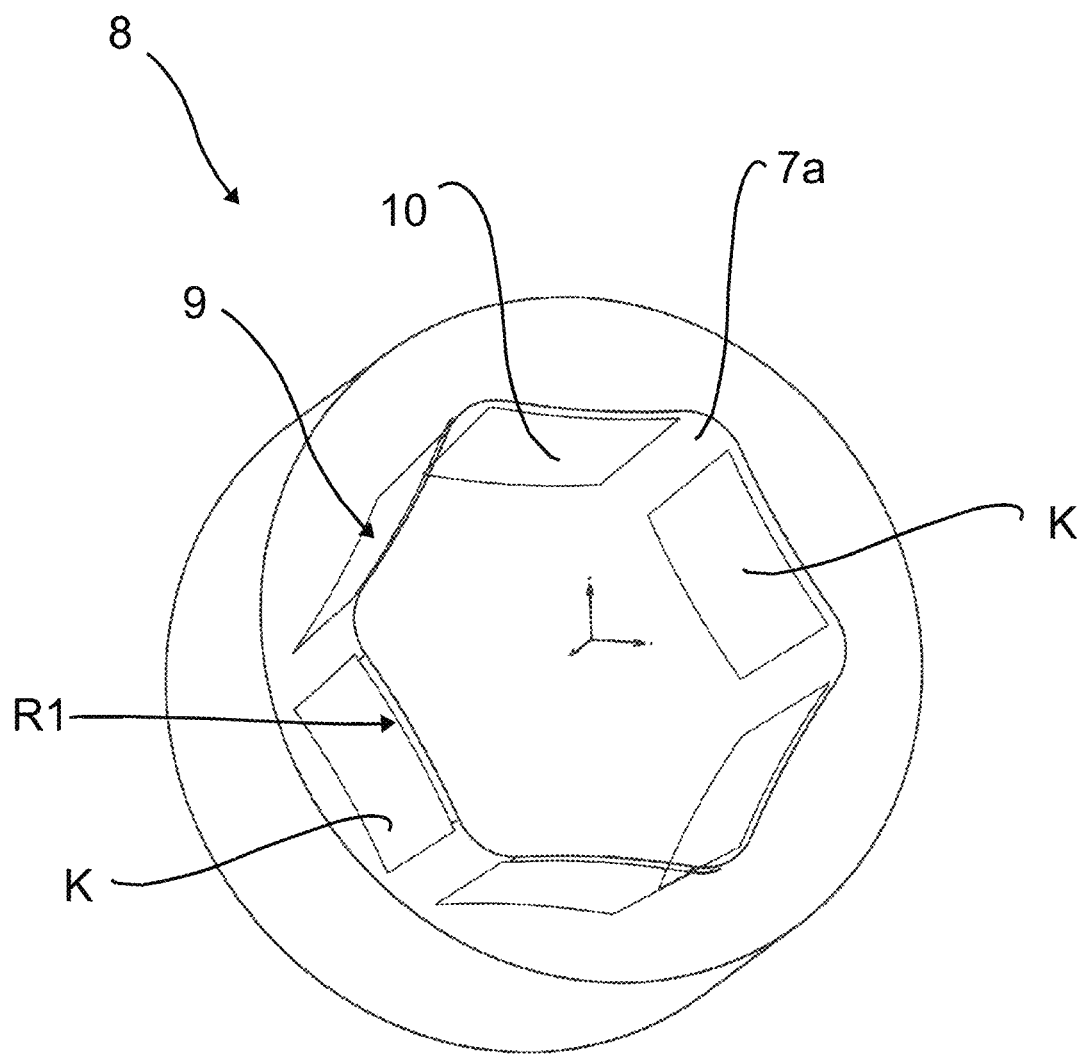
Figure 9:
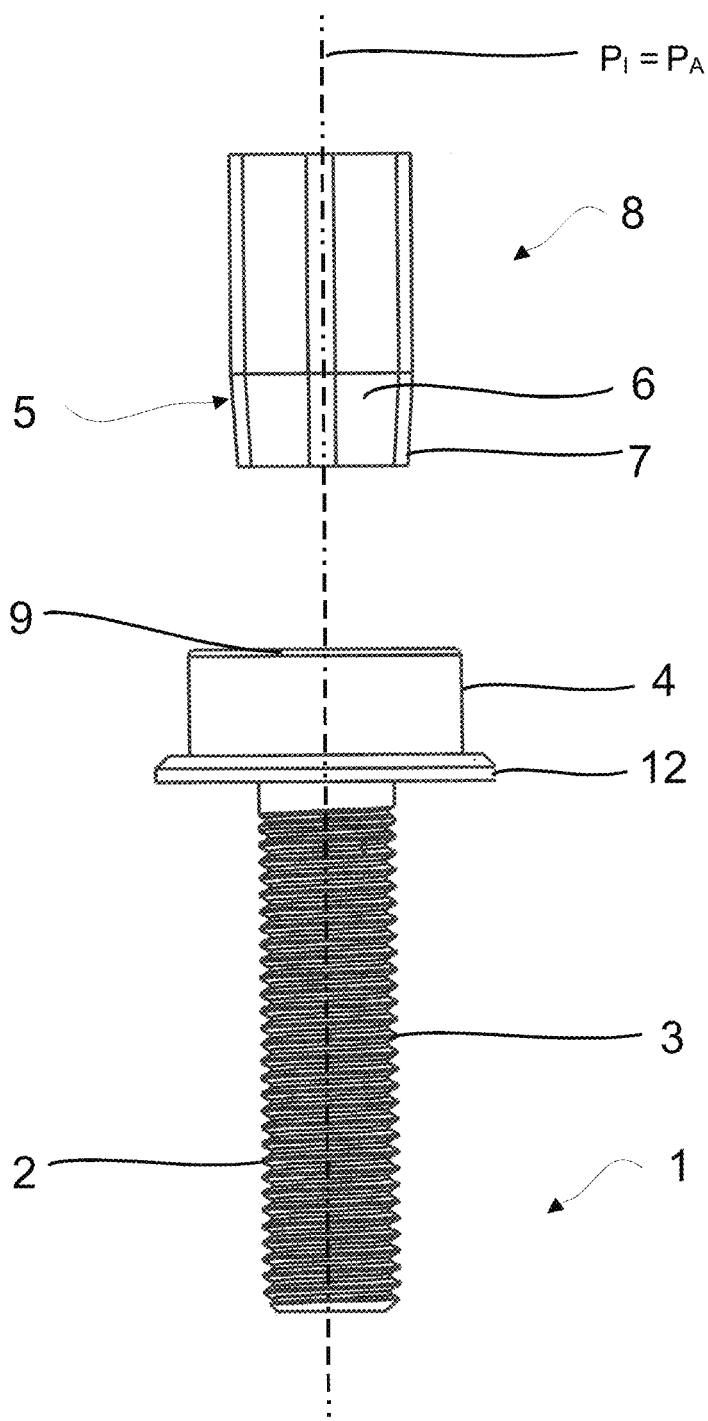
Figure 10:
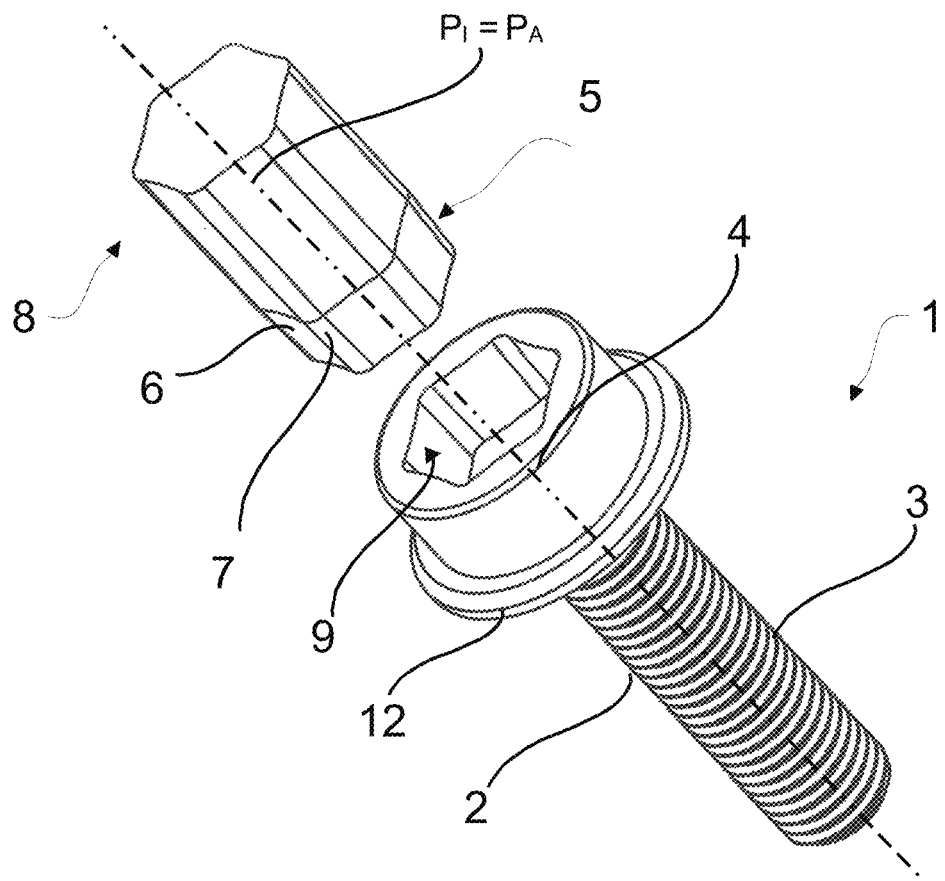
Figure 11:
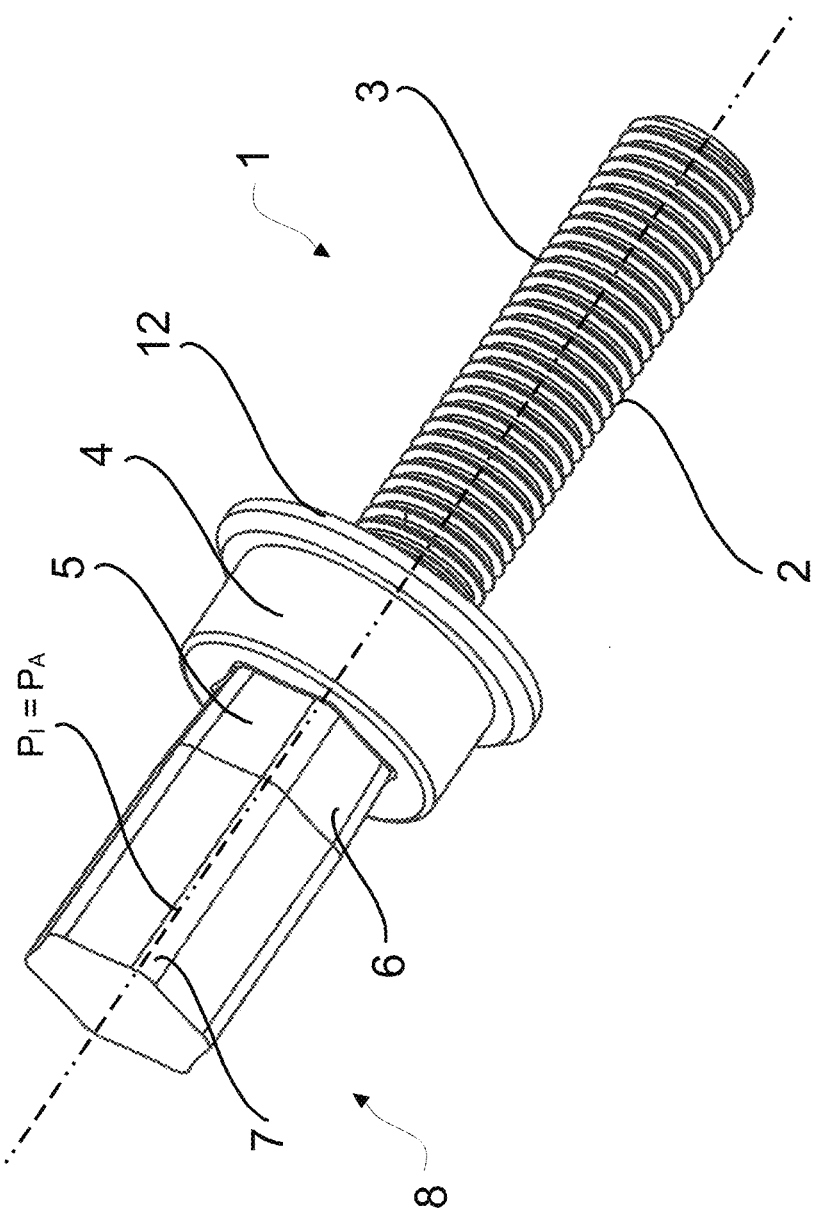

The arrangement is such that—as it can be seen in particular in FIG. 7, where contact zones K are drawn, in which the driving profiles 5, 9 come into contact—surface contact/engagement takes place exclusively in the region of driving surfaces 6, 10, but not in the transition regions 7, 7a lying in between, and the contact zones K, viewed in the circumferential direction, each extend on both sides of the apex of the concavely curved driving surfaces 6, 10. In the embodiment shown, the contact zones K, viewed in circumferential direction, extend over almost the entire length of the drive surfaces 6, 10. In other words, there is almost full contact between the drive surfaces 6, 10 of the two components 1, 8, so that the two components 1, 8 are aligned exactly coaxially with each other when the two driving profiles 5, 9 are plugged together axially until a clamping connection is made between the two components 1, 8 due to the conicity of the driving profiles of the drive surfaces 6, 10. Furthermore, the surface contact creates a force-fit connection by means of which high torques can be transmitted.

Figure 12:
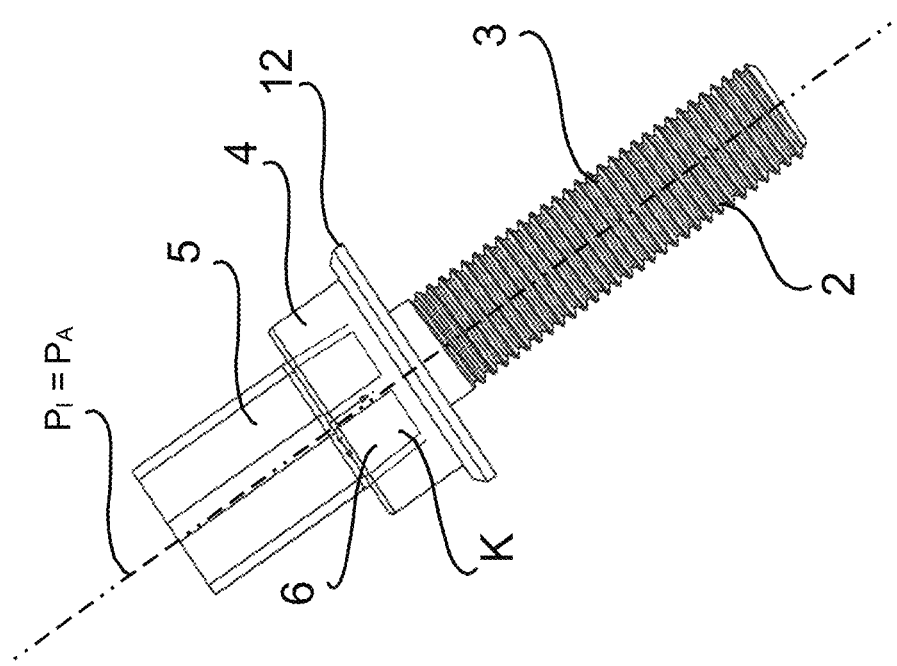

In this way, the dimensions of the outer driving profile 5 of the screw 1 and of the inner driving profile 9 of the tool 8 are selected in such a way that the drive surfaces 6, 10 of the driving profiles 5, 9 come into almost full contact with each other when the two driving profiles 5, 9 are plugged together axially. As shown in FIG. 12, the driving profiles 5, 9 come into contact with each other only in the region of their drive surfaces 6, 10, the contact zones K are indicated in the Figure, whereas no contact takes place between the transition regions 7, 7a located between the drive surfaces 6, 10.

FIGS. 9 to 12 show a screw and a corresponding rotary tool 8 according to a second embodiment of the present invention. Here, the screw 1 is designed in the form of a flange head screw with a flange 12 located on the side of the screw head 4 facing the shank 2. The constellation of the driving profiles 5, 9 is reverse to that of the first embodiment. Specifically, the screw 1 has the inner driving profile 9 with internal drive surfaces 10, whereas the rotary tool 8 has the outer driving profile 5 with external drive surfaces 6. Otherwise, the driving profiles 5, 9 are clearly formed as in the first embodiment when the two driving profiles 5, 9 are plugged together axially. Here, the drive surfaces 6, 10 of the driving profiles 5, 9 come into contact with each other over their entire surface in order to establish a rotationally fixed connection between the components 1, 8 on the one hand and to connect the driving profiles 5, 9 in a force-fitting manner so that they are axially aligned and fixed to each other on the other end.

Figure 13:
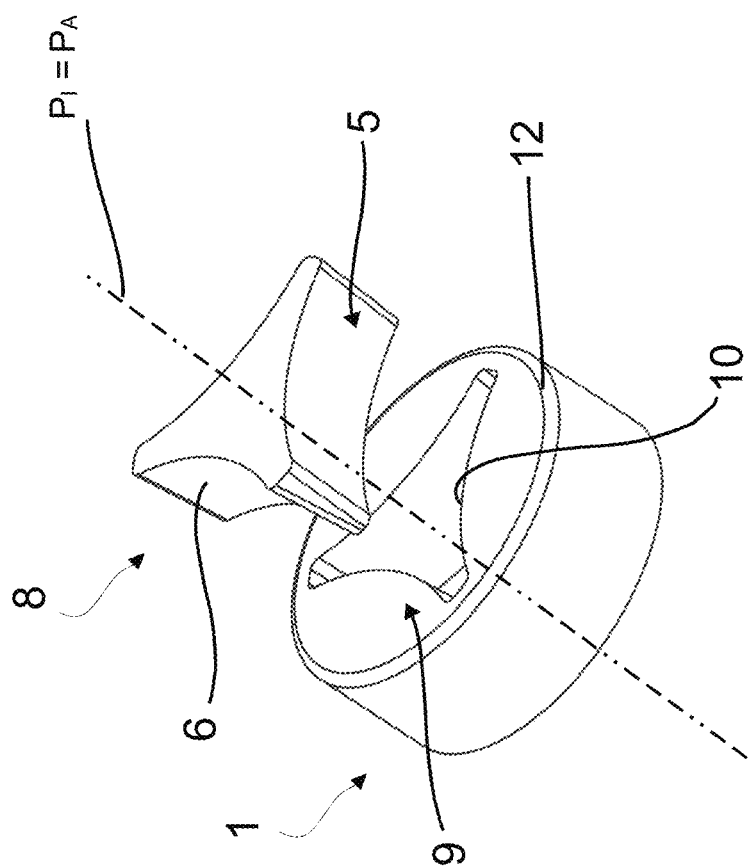

FIG. 13 shows a third embodiment of the present invention with a first component 1, which has an outer driving profile with concave drive surfaces 6 and transition regions 7 lying in between, and a component 8, which has an inner driving profile 9 with corresponding drive surfaces 10 and transition regions 7a lying in between. The driving profiles 5, 9 are designed in the same way as the driving profiles 5, 9 for the previously described embodiments with the only proviso that there are only three instead of six driving surfaces 6, 10.

Finally, FIG. 14 shows a fourth embodiment of the present invention with a component 1, which has an outer driving profile 5, and a component 8, which has a corresponding inner driving profile 9. Drive surfaces 6, 10 are here designed as circular arc surfaces inclined at an angle $\alpha=3°$ with respect to the profile axis $P_I$, $P_A$, the radius R1 of which drive surfaces is constant over the entire length of the driving profiles 5, 9. In contrast to the previously described embodiments, however, the drive surfaces 6, 10 are not concave, but convex.

FIG. 14 does not show that the transition regions 7, 7a between the drive surfaces 6, 10 are rounded to create a continuous transition between the drive surfaces 6, 10. The transition regions 7, 7a are designed such that the two components 1, 8 do not come into contact with each other in these transition regions. If the transition regions 7, 7a are designed as circular arc segments, they preferably have a radius which is constant over their entire axial length, wherein the radius of component 8 with the inner driving profile 9 is larger than the radius of the transition regions 7, 7a of component 1 with the outer driving profile 5.

The invention claimed is:

1. Method for connecting two components, namely a screw (1) and a rotary tool (8), in a rotationally fixed manner with respect to the longitudinal axis of the component designed as a screw (1), wherein one of the components has an outer driving profile (5) with external drive surfaces (6) and the other component has an inner driving profile (9) being complementary to the outer driving profile (5) and having internal drive surfaces (10), by plugging the driving profiles (5, 9) of the components together axially in order to achieve a positive, rotationally fixed connection of the components by the interaction of the driving profiles (5, 9), wherein the driving profiles (5, 9) each define a profile axis (PA, PI) and the profile axis (PA, PI) of the component designed as a screw (1) extends coaxially to the longitudinal axis thereof, the drive surfaces (6) of the component with the outer driving profile (5) are inclined relative to the respective profile axis (PA, PI) of the component and approach the respective profile axis (PA, PI) towards the free end of the component, the drive surfaces (10) of the component with the inner driving profile (9) are inclined relative to the respective profile axis (PA, PI) of the component and become averted from the respective profile axis (PA, PI) towards the free end of the component, and the driving profiles (5, 9) are designed complementary to one another in such a way, that the inclined drive surfaces (6, 10) of the components (1, 8) come into surface contact with one another, when the components (1, 8) are plugged together axially, so that the interaction of the driving profiles (5, 9) produces a force-fit and/or clamping connection between the components (1, 8), via which the components (1, 8) are axially connected to one another, wherein
components (1, 8) are used, in which the drive surfaces (6, 10) of the driving profiles (5, 9) have a constant inclination relative to their profile axis (PA, PI) in the contact regions, in which they come into surface contact/engagement, which inclination is the same for all drive surfaces of both components (1, 8), and in that a component with an outer driving profile (5) is used, in which the drive surfaces (6) are all concave or all convex in cross-section, i.e. inwardly or outwardly curved, and a component with an inner driving profile (9) complementary to the outer driving profile (5) is used, the drive surfaces (10) of which inner driving profile (9) are curved in a complementary convex/concave manner with respect to the drive surfaces (6) of the outer driving profile (5) in such a way that, in the plugged state, the drive surfaces (6, 10) of the two components (1, 8), viewed in the circumferential direction, come into surface contact/engagement with one another on both sides of the apex of the concave/convex curvature, and in that the driving profiles (5, 9) are designed in such a way that they do not come into contact with one another in the transition regions lying between the drive surfaces (6, 10).

2. Method according to claim 1, wherein components (1, 8) are used, the drive surfaces (6, 10) of which are designed to be complementary to one another in such a way that the drive surfaces (6, 10) of the two components (1, 8) are in surface contact with one another over at least 25%, in particular at least 40% and preferably at least 60% of their extent in the circumferential direction.

3. Method according to claim 2, wherein components (1, 8) are used, the drive surfaces (6, 10) of which have a parabolic segment-shaped cross-section in the contact region over their length.

4. Method according to claim 2, wherein components (1, 8) are used, in which the drive surfaces (6, 10) of the driving profiles (5, 9) have a circular arc segment-shaped cross-section over their length with a radius (R1) which is constant over the axial length in the contact region.

5. Method according to claim 2, wherein components (1, 8) are used, in which the drive surfaces (6, 10) of the driving profiles (5, 9) have a circular arc segment-shaped cross-section, wherein the radius of the circular arc segment-shaped cross-section changes continuously over the length of the drive surfaces (6, 10) in the contact region.

6. Method according to claim 2, wherein components with an outer driving profile (5) and/or with an inner driving profile (9) are used, in which the transition regions lying between the drive surfaces (6, 10) have an opposite curvature to that of the drive surfaces (6, 10), wherein the curvature of the transition regions of the outer driving profile (5) is smaller than the curvature of the transition regions of the inner driving profile (9), when the drive surfaces of the outer driving profile (5) are concavely curved so that the apex of the curvature faces in the direction of the profile axis, and the curvature of the transition regions of the outer driving profile (5) is larger than the curvature of the transition regions of the inner driving profile (9), when the drive surfaces of the outer driving profile are convexly curved.

7. Method according to claim 1, wherein components (1, 8) are used, the drive surfaces (6, 10) of which have a parabolic segment-shaped cross-section in the contact region over their length.

8. Method according to claim 7, wherein components with an outer driving profile (5) and/or with an inner driving profile (9) are used, in which the transition regions lying between the drive surfaces (6, 10) have an opposite curvature to that of the drive surfaces (6, 10), wherein the curvature of the transition regions of the outer driving profile (5) is smaller than the curvature of the transition regions of the inner driving profile (9), when the drive surfaces of the outer driving profile (5) are concavely curved so that the apex of the curvature faces in the direction of the profile axis, and the curvature of the transition regions of the outer driving profile (5) is larger than the curvature of the transition regions of the inner driving profile (9), when the drive surfaces of the outer driving profile are convexly curved.

9. Method according to claim 1, wherein components (1, 8) are used, in which the drive surfaces (6, 10) of the driving profiles (5, 9) have a circular arc segment-shaped cross-section over their length with a radius (R1) which is constant over the axial length in the contact region.

10. Method according to claim 9, wherein components with an outer driving profile (5) and/or with an inner driving profile (9) are used, in which the transition regions lying between the drive surfaces (6, 10) have an opposite curvature to that of the drive surfaces (6, 10), wherein the curvature of the transition regions of the outer driving profile (5) is smaller than the curvature of the transition regions of the inner driving profile (9), when the drive surfaces of the outer driving profile (5) are concavely curved so that the apex of the curvature faces in the direction of the profile axis, and the curvature of the transition regions of the outer driving profile (5) is larger than the curvature of the transition regions of the inner driving profile (9), when the drive surfaces of the outer driving profile are convexly curved.

11. Method according to claim 1, wherein components (1, 8) are used, in which the drive surfaces (6, 10) of the driving profiles (5, 9) have a circular arc segment-shaped cross-section, wherein the radius of the circular arc segment-shaped cross-section changes continuously over the length of the drive surfaces (6, 10) in the contact region.

12. Method according to claim 11, wherein components with an outer driving profile (5) and/or with an inner driving profile (9) are used, in which the transition regions lying between the drive surfaces (6, 10) have an opposite curvature to that of the drive surfaces (6, 10), wherein the curvature of the transition regions of the outer driving profile (5) is smaller than the curvature of the transition regions of the inner driving profile (9), when the drive surfaces of the outer driving profile (5) are concavely curved so that the apex of the curvature faces in the direction of the profile axis, and the curvature of the transition regions of the outer driving profile (5) is larger than the curvature of the transition regions of the inner driving profile (9), when the drive surfaces of the outer driving profile are convexly curved.

13. Method according to claim 1, wherein components with an outer driving profile (5) and/or with an inner driving profile (9) are used, in which the transition regions lying between the drive surfaces (6, 10) have an opposite curvature to that of the drive surfaces (6, 10), wherein the curvature of the transition regions of the outer driving profile (5) is smaller than the curvature of the transition regions of the inner driving profile (9), when the drive surfaces of the outer driving profile (5) are concavely curved so that the apex of the curvature faces in the direction of the profile axis, and the curvature of the transition regions of the outer driving profile (5) is larger than the curvature of the transition regions of the inner driving profile (9), when the drive surfaces of the outer driving profile are convexly curved.

14. Method according to claim 13, wherein the transition regions of the component with the outer driving profile (5) and/or of the component with the inner driving profile (9) are formed in the shape of a segment of a circle arc in cross-section, wherein the radii (R2) of the transition regions of the outer driving profile (5) are larger than the radii (R2) of the transition regions of the inner driving profile (9), when the drive surfaces of the outer driving profile are concavely curved so that the apex of the curvature faces the profile axis (PA), and the radii (R2) of the transition regions of the outer driving profile are smaller than the radii (R2) of the transition regions of the inner driving profile, when the drive surfaces of the outer driving profile are convexly curved, and wherein the radii (R2) of the transition regions are preferably constant over the length of the drive surfaces (6, 10).

15. Method according to claim 14, wherein the transition regions and the drive surfaces (6, 10) merge continuously into one another.

16. Method according to claim 13, wherein the transition regions and the drive surfaces (6, 10) merge continuously into one another.

17. Method according to claim 1, wherein components are used, in which the drive surfaces (6, 10) of the driving profiles (5, 9) are inclined in the contact region by at least 1°, in particular by at least 2°, relative to the profile axis (PA, PI) of the respective component, and/or in that components are used, in which the inclined drive surfaces (6, 10) of the driving profiles (5, 9) are inclined by at most 8°, preferably by at most 5°, relative to the respective profile axis (PA, PI).

18. Method according to claim 17, wherein components are used, in which the drive surfaces (6, 10) of the driving profiles (5, 9) are inclined in the contact region by at least 1.5°, in particular at least 2° and at most 3.5°, preferably by 3°, relative to the profile axis (PA, PI) of the respective component.

19. Method according to claim 1, wherein components are used, the driving profiles (5, 9) of which, viewed in the circumferential direction, have 3, 4 or 6 drive surfaces (6, 10) lying next to one another with transition regions lying in between.

20. Method according to claim 19, wherein components are used, the driving profiles of which have the cross-section of a multi-circle, wherein, in particular, components are used, the driving profiles of which have the cross-section of multi-circles with ogival arms and/or components are used, the driving profiles of which have the cross-section of a multi-circle with six arms.

* * * * *